(12) United States Patent
Tamura et al.

(10) Patent No.: US 12,535,495 B2
(45) Date of Patent: Jan. 27, 2026

(54) PREPROCESSING DEVICE

(71) Applicant: HITACHI HIGH-TECH CORPORATION, Tokyo (JP)

(72) Inventors: Kazuma Tamura, Tokyo (JP); Hiroshi Watanabe, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 154 days.

(21) Appl. No.: 18/688,492

(22) PCT Filed: Jun. 29, 2022

(86) PCT No.: PCT/JP2022/026014
§ 371 (c)(1),
(2) Date: Mar. 1, 2024

(87) PCT Pub. No.: WO2023/037725
PCT Pub. Date: Mar. 16, 2023

(65) Prior Publication Data
US 2025/0123301 A1    Apr. 17, 2025

(30) Foreign Application Priority Data
Sep. 13, 2021    (JP) ................... 2021-148726

(51) Int. Cl.
*G01N 35/10* (2006.01)
*B23B 5/14* (2006.01)

(52) U.S. Cl.
CPC ............ *G01N 35/1065* (2013.01); *B23B 5/14* (2013.01); *G01N 2035/103* (2013.01)

(58) Field of Classification Search
CPC ......... G01N 35/1065; G01N 2035/103; G01N 35/1072; G01N 35/1095; B23B 1/00; B23B 5/14
(Continued)

(56) References Cited

U.S. PATENT DOCUMENTS 7,607,375 B2 * 10/2009 Harding .............. B29C 66/8322
82/47
9,027,604 B2    5/2015 Lofving et al.
(Continued)

FOREIGN PATENT DOCUMENTS

CN    103746269 A    4/2014
EP        0588236 A2    3/1994
(Continued)

OTHER PUBLICATIONS

Search Report mailed Sep. 6, 2022 in International Application No. PCT/JP2022/026014.
(Continued)

*Primary Examiner* — David J Walczak
(74) *Attorney, Agent, or Firm* — Miles & Stockbridge, P.C.

(57) ABSTRACT

A preprocessing device that carries out a dispensing process for aspirating a liquid sample accommodated in a sample container, and subsequently discharging and dispensing the sample into another sample container, the preprocessing device comprising: a dispensing nozzle; a dispensing nozzle tip detachably provided to the distal end of the dispensing nozzle; a disposal box in which the dispensing nozzle tip is disposed of after having been removed from the dispensing nozzle; and a cutting mechanism for cutting a dispensing nozzle tip inserted into a removal part, which removes the dispensing nozzle tip from the dispensing nozzle, from the longitudinal-direction side. This makes it possible to improve accommodation efficiency while suppressing accumulation of disposed-of dispensing nozzle tips.

4 Claims, 7 Drawing Sheets

(58) Field of Classification Search
USPC ......... 222/80; 83/411.1, 411.2, 411.5, 411.7, 83/923; 82/46–48, 101; 425/289, 16
See application file for complete search history.

(56) References Cited

U.S. PATENT DOCUMENTS

| | | |
|---|---|---|
| 2009/0320621 A1 | 12/2009 | Takahata et al. |
| 2017/0059600 A1 | 3/2017 | Obari et al. |
| 2019/0241858 A1 | 8/2019 | Singer et al. |

FOREIGN PATENT DOCUMENTS

| | | |
|---|---|---|
| JP | 2007-139470 A | 6/2007 |
| JP | 2008-039674 A | 2/2008 |
| JP | 2015-169639 A | 9/2015 |

OTHER PUBLICATIONS

Written Opinion mailed Sep. 6, 2022 in International Application No. PCT/JP2022/026014.
International Preliminary Report on Patentibility mailed Mar. 28, 2024 in International Application No. PCT/JP2022/026014.
Search Report mailed Jul. 8, 2025 in European Application No. 22867049.3.

* cited by examiner

PREPROCESSING DEVICE

TECHNICAL FIELD

The present invention relates to a preprocessing device.

BACKGROUND ART

As a device related to an automatic analyzer, a preprocessing device has been known, such as a specimen dispensing device, which preprocesses a specimen to be changed to an analyzable state. The specimen dispensing device is a device installed in an testing laboratory of a hospital or an examination institution together with (or as part of) an automatic analyzer, and is used to dispense a specimen from a primary specimen container, in which specimens collected from subjects such as blood and urine are accommodated, into an empty aliquot specimen container that is compatible with analysis with various analyzing devices.

During a dispensing process in the dispensing device, for example, a dispensing head equipped with a dispensing nozzle tip, as a consumable, aspirates a specimen in the primary specimen container and discharges the aspirated specimen into the aliquot specimen container. Further, when the dispensing process is completed, the dispensing nozzle tip attached to the dispensing head is removed from the dispensing head by a tip remover and is disposed of into a disposal box provided in the dispensing device. At this time, tip removers are placed in two locations above the box to dispersedly dispose of the dispensing nozzle tips, thereby preventing the dispensing nozzle tips stacked in the disposal box from concentrating in one location.

Techniques related to disposal of dispensing nozzle tips in such a dispensing device have been known, for example, as described in Patent Literatures 1 and 2.

Patent Literature 1 discloses a method for storing a pipette tip, the method including the steps of: (a) cutting at least a part of a pipette tip; (b) stacking a plurality of cut pipette tips together more closely using a deformability of a pipette tip obtained by the cutting step; and (c) storing the cut pipette tip in a predetermined storage area.

Patent Literature 2 discloses a nozzle tip disposal device configured to drop and disposes of a nozzle tip pulled out from a nozzle base, characterized in that: a pair of rotating rollers arranged parallel to each other and rotating in opposite directions are provided below a tip remover for removing and pulling out the nozzle tip; and the nozzle tip is dropped into a gap between the pair of rotating rollers, and then the nozzle tip is crushed by a pressing force of the pair of rotating rollers.

CITATION LIST

Patent Literature

PTL 1: JP2008-039674A
PTL 2: JP2007-139470A

SUMMARY OF INVENTION

Technical Problem

By the way, since there is a limit to the number of dispensing nozzle tips that can be accommodated in a disposal box, for example, when exceeding a preset threshold value, an alarm is issued to prompt an operator to remove dispensing nozzle tips in the disposal box therefrom. On the other hand, since a dispensing device is temporarily suspended in its processing when removing the dispensing nozzle tips inside the disposal box therefrom, it is preferable that a frequency of such removal is reduced.

In disposing of dispensing nozzle tips in the dispensing device, for example, tip removers are placed in two locations above the box to dispersedly dispose of the dispensing nozzle tips, thereby preventing the dispensing nozzle tips to be stacked in the disposal box from concentrating in one location. However, there is a problem in that when dispensing nozzle tips disposed of are stacked in the disposal box, in some rare cases, the dispensing nozzle tips may be accumulated in a bamboo shoot shape, and when such a phenomenon occurs, the dispensing nozzle tips are easily accumulated up to an entrance of the disposal box, thereby making it impossible to dispose of subsequent dispensing nozzle tips.

The present invention has been made in view of the above-described problem, and an object thereof is to provide a preprocessing device capable of improving accommodation efficiency while suppressing accumulation of disposed-of dispensing nozzle tips.

Solution to Problem

The present application includes a plurality of solutions to solve the above-described problem and an example thereof is as follows: a preprocessing device configured to carry out a dispensing process for aspirating a liquid specimen accommodated in a specimen container, and subsequently discharging and dispensing the specimen into another specimen container, the preprocessing device includes: a dispensing nozzle; a dispensing nozzle tip detachably provided to a fitting part at a tip of the dispensing nozzle; a disposal box in which the dispensing nozzle tip is disposed of after having been removed from the dispensing nozzle; and a cutting mechanism for cutting a dispensing nozzle tip inserted into a removal part, which removes the dispensing nozzle tip from the dispensing nozzle, from the longitudinal-direction side.

Advantageous Effects of Invention

According to the present invention, it is possible to improve accommodation efficiency while suppressing accumulation of disposed-of dispensing nozzle tips.

DESCRIPTION OF EMBODIMENTS

Hereinafter, embodiments of the present invention will be described with reference to the drawings.

Figure 1:
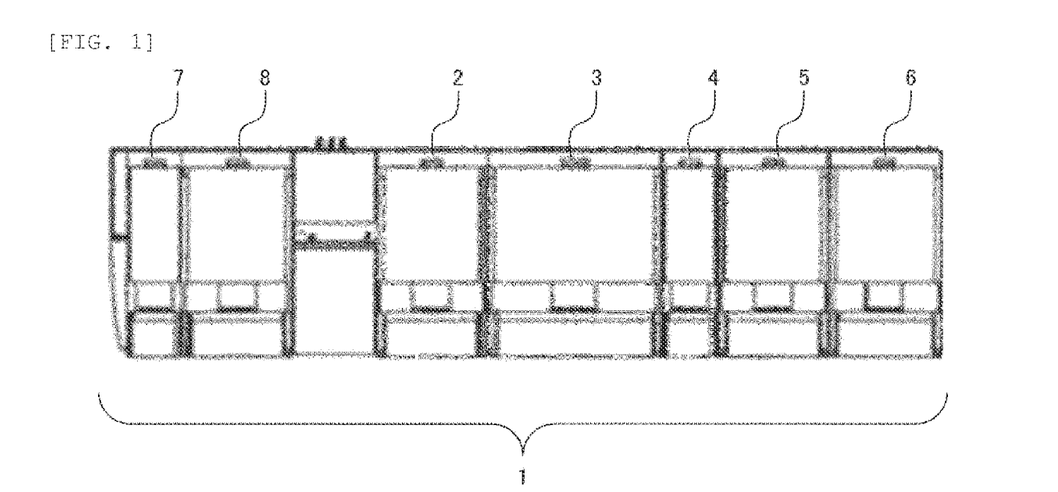
FIG. 1 is a diagram schematically illustrating an overall configuration of a specimen test automation system, which is an example of a preprocessing device.

FIG. 1 is a diagram illustrating schematically an overall configuration of a specimen test automation system, which is an example of a preprocessing device according to the present embodiment.

In FIG. 1, a specimen test automation system 1 is configured with an input module 2, a centrifugal separation module 3, an decapping module 4, a aliquot tube preparation module 5, a dispensing module 6, a closing module 7, and a storage module 8.

Each module 2 to 8 has a transporting device, such as a belt conveyor, inside capable of transporting a specimen transporting holder for loading and transporting a specimen, such as blood or urine, and can exchange the specimen transporting holder with the other adjacent modules by the transporting device.

The input module 2 is a module configured to input, into the specimen test automation system 1, a specimen container (hereinafter referred to as a primary specimen) in which a specimen collected from, for example, a patient, such as blood or urine, is accommodated. The primary specimen is input by an operator into the input module 2. Here, a case is exemplified where three primary specimens are input thereinto.

The three primary specimens which are input into the input module 2 are sequentially loaded from the input position onto the specimen transporting holder placed on a transporting device by a moving mechanism such as a robot arm which is not illustrated, and are transported to the other modules by the transporting device. The primary specimen input to the input module 2 is transported together with the specimen transporting holder to the centrifugal separation module 3 or the decapping module 4 in accordance with each analysis request item.

In the centrifugal separation module 3, the transported primary specimen is subjected to a centrifugal separation process, and then is transported together with the specimen transporting holder to the aliquot tube preparation module 5 or the decapping module 4. In the decapping module 4, an decapping process is performed to decap the primary specimen (specimen container), and then the primary specimen is transported together with the specimen transporting holder to the aliquot tube preparation module 5.

The primary specimen transported to the aliquot tube preparation module 5 is further transported to the dispensing module 6 by the transporting device. Moreover, when the primary specimen passes through the inside of the aliquot tube preparation module 5, in the aliquot tube preparation module 5, a specimen container (aliquot specimen container) is prepared to which information on the primary specimen (e.g., a bar code on which information is printed) is added, and is loaded on a specimen transporting holder placed on a transporting device, and is transported together with the specimen transporting holder to the dispensing module 6.

The dispensing module 6 performs a dispensing process for dispenses the primary specimen transported together with the specimen transporting holder by the transporting device into the aliquot specimen container similarly transported together with the specimen transporting holder by the transporting device (described in detail later).

In the closing module 7, a closing process is performed for closing the primary specimen (specimen container) opened by the decapping module 4 and the aliquot specimen container prepared by the dispensing module 6, and then transport to the storage module 8 respectively together with the specimen transporting holders by the transporting device.

The storage module 8 performs storage by heat insulation of the primary specimen and the aliquot specimen container which are transported from the closing module 7 respectively together with the specimen transporting holders. The aliquot specimen container stored in the storage module 8 is input into the analyzing device or the like by the operator or the transporting device.

Figure 2:
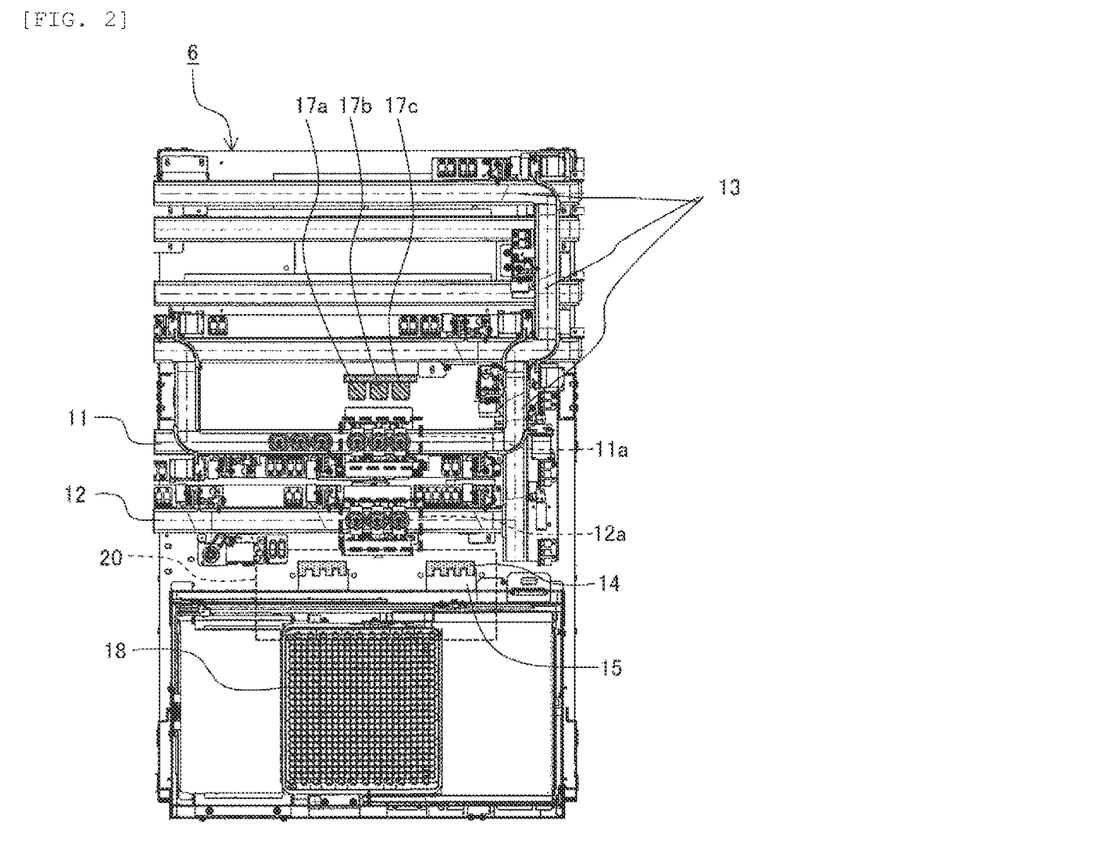
FIG. 2 is a top view diagram schematically illustrating an internal configuration of a dispensing module.
Figure 3:
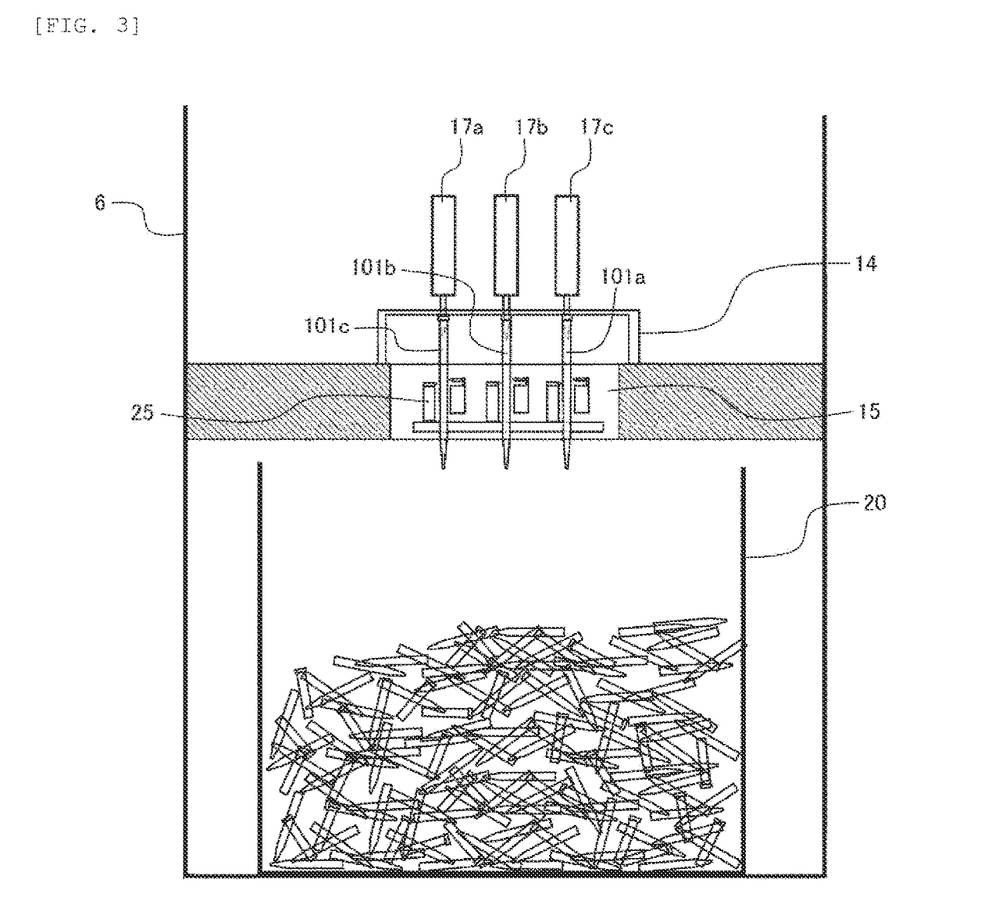
FIG. 3 is a longitudinal sectional view diagram schematically illustrating a dispensing tip disposal duct provided in the dispensing module, extracted together with a related configuration.

FIG. 2 is a top view diagram schematically illustrating an internal configuration of the dispensing module. Furthermore, FIG. 3 is a longitudinal sectional view diagram schematically illustrating a dispensing tip disposal duct provided in the dispensing module, extracted together with a related configuration.

In FIG. 2, the dispensing module 6 includes a primary specimen transportation line 11 configured to transport a specimen transporting holder on which a primary specimen is loaded by a transporting device (e.g., belt conveyor), a aliquot specimen transportation line 12 configured to transport a specimen transporting holder on which a aliquot specimen container is loaded by a transporting device (e.g., belt conveyor), and a carry-out line 13 configured to carry out the specimen transporting holder on which the primary specimen (specimen container) is loaded and the specimen transporting holder on which the aliquot specimen container is loaded after the dispensing process.

A dispensing waiting position of the primary specimen 11a is set on the primary specimen transportation line 11, where a specimen transporting holder on which a primary specimen (specimen container) to be subjected to the dispensing process is loaded waits during the dispensing process. Moreover, a aliquot specimen dispensing waiting position 12a is set on the aliquot specimen transportation line 12, where a aliquot specimen container corresponding to the primary specimen which waits at the dispensing waiting position of the primary specimen 11a waits during the dispensing process.

The dispensing module 6 includes a plurality of (e.g., three) dispensing heads 17a, 17b, and 17c that can integrally move between above the dispensing waiting position of the primary specimen 11a of the primary specimen transportation line 11 and above the aliquot specimen dispensing waiting position 12a of the aliquot specimen transportation line 12. As illustrated also in FIG. 3, the dispensing heads 17a, 17b, and 17c each have a cylindrical shape extending in an up-and-down direction, and their lower tips (lower edges) each have a tapered shape that tapers downward so as to be able to be inserted and attached to a dispensing nozzle tip 101a.

A tip magazine 18 including a large number of insertion holes into which a plurality of dispensing nozzle tips 101a are inserted to be held is placed in front of (below in FIG.

2) the primary specimen transportation line 11 and the aliquot specimen transportation line 12 in the dispensing module 6. The dispensing nozzle tip 101a has a cylindrical shape which tapers down toward one end (tip). The dispensing nozzle tip 101a is formed through in each of the plurality of insertion holes on the tip magazine 18 with the tip facing downward.

A tip remover 14 for removing the dispensing nozzle tip 101a attached to each dispensing heads 17a, 17b, and 17c is placed in front of (below in FIG. 2) the primary specimen transportation line 11 and the aliquot specimen transportation line 12 in the dispensing module 6 and in back of (above in FIG. 2) the tip magazine 18. The tip remover 14 has a plate shape placed along a horizontal direction, and includes the same number or more (in this case, three) of U-shaped notched parts at the same interval as the dispensing heads 17a, 17b, and 17c which are provided so that the dispensing heads 17a, 17b, and 17c can be inserted from a horizontal direction. A width of each U-shaped notches in the tip remover 14 is formed so as to be wider than a coupling portion of the dispensing nozzle tip 101a to the dispensing heads 17a, 17b, and 17c and narrower than an upper edge (an edge portion different from the tip) of the dispensing nozzle tip 101a. In other words, the dispensing heads 17a, 17b, and 17c are moved upward (in a front direction of the drawing sheet of FIG. 2) in a state where the dispensing heads 17a, 17b, and 17c to each of which the dispensing nozzle tip 101a is attached are respectively inserted into the U-shaped notches of the tip remover 14 from the horizontal direction, and thereby the dispensing nozzle tip 101a can be removed from each dispensing heads 17a, 17b, and 17c.

Moreover, below the tip remover 14 (in a back direction of the drawing sheet of FIG. 2), a disposal duct 15 is placed, through which the dispensing nozzle tip 101a extracted from each dispensing heads 17a, 17b, and 17c by the tip remover 14 to be disposed of is passed. Furthermore, a disposal box 20 capable of accommodating a large number of the used dispensing nozzle tips 101a which have passed through the disposal duct 15 is placed below the disposal duct 15 (in the back direction of the drawing sheet of FIG. 2).

As illustrated in FIG. 3, a cutting mechanism 25 configured to cut the dispensing nozzle tip 101a from a longitudinal-direction side is provided in the disposal duct 15. The cutting mechanism 25 performs a cutting process when disposing of the used dispensing nozzle tips 101a each fixed to the dispensing heads 17a, 17b, and 17c. Hereinafter, details of the cutting mechanism 25 will be described.

Figure 4:
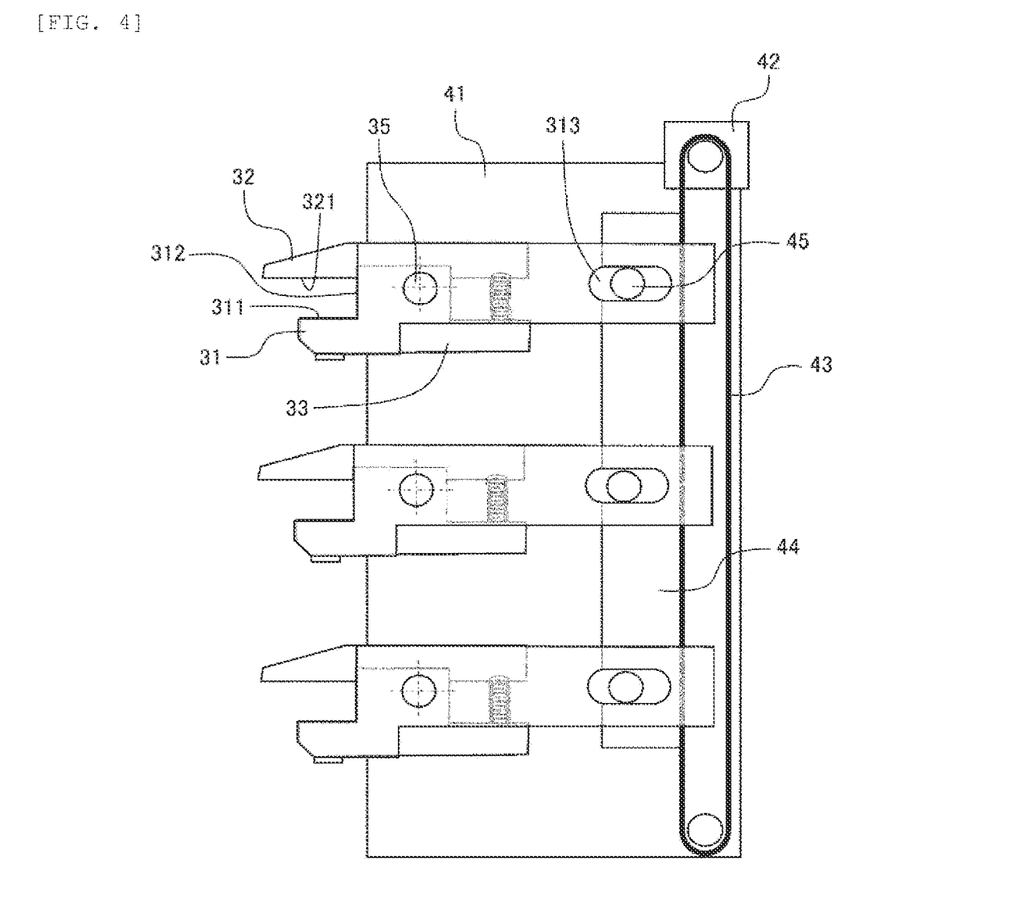
FIG. 4 is a plan view diagram schematically illustrating a tip cutting mechanism extracted.
Figure 5:
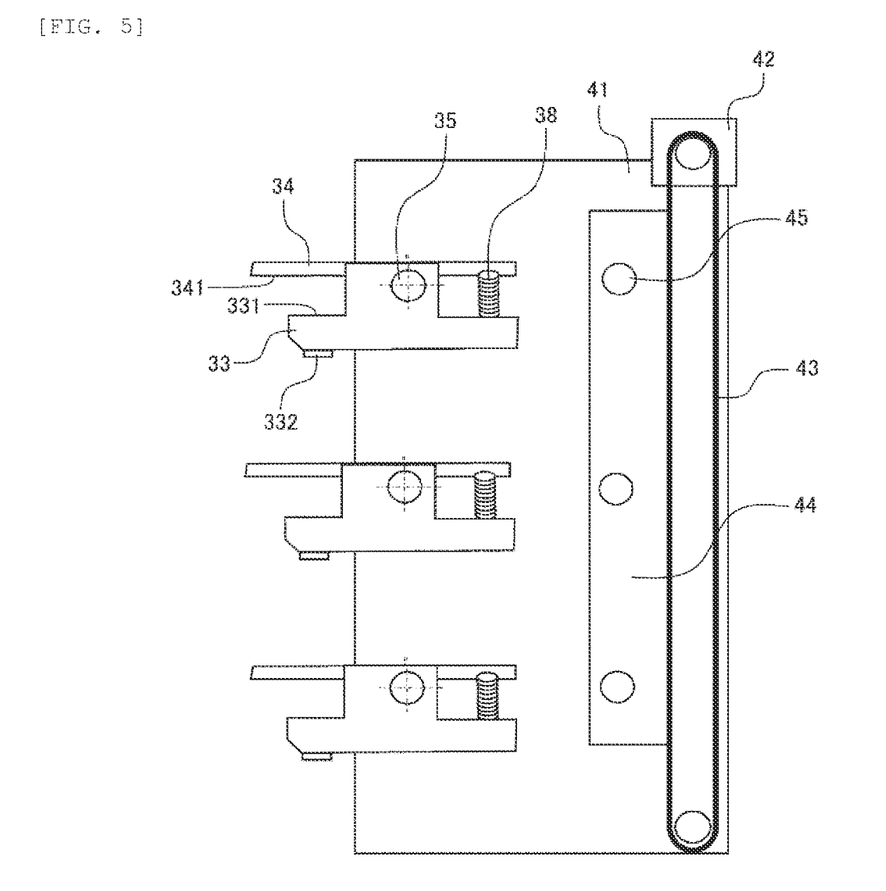
FIG. 5 is a plan view diagram schematically illustrating a tip holding unit of the tip cutting mechanism extracted.

FIG. 4 is a plan view diagram schematically illustrating a tip cutting mechanism extracted. FIG. 5 is a plan view diagram schematically illustrating a tip holding unit of the tip cutting mechanism extracted.

As illustrated in FIGS. 3 and 4, the cutting mechanism 25 includes the same or more (in this case, three, the same number as the dispensing heads 17a, 17b, and 17c) cut parts as the dispensing heads 17a, 17b, and 17c. Hereinafter, the cut part related to the dispensing head 17a will be described as a representative, and the description of other cut parts having the similar configuration will be omitted.

The cut part related to the dispensing head 17a includes: a first blade 31 including a first blade surface 311 and a second blade surface 312 continuously formed so as to abut from different directions on a side surface of the dispensing nozzle tip 101a, and rotatably provided in a direction along a plane including the first blade surface 311 and the second blade surface 312; and a second blade 32 having a blade surface 321 formed so as to abut on a side surface of the dispensing nozzle tip 101a from a different direction from the first blade surface 311 and the second blade surface 312 of the first blade 31, and relatively fixed to the first blade 31.

More specifically, the first blade 31 is rotatably supported in the horizontal direction by a pin 35 fixed to a base 41 of the cutting mechanism 25. Furthermore, the second blade 32 is fixed to the base 41 of the cutting mechanism 25. Moreover, the first blade 31 is rotated in the direction of the second blade 32 in a state where the dispensing nozzle tip 101a is placed between the first blade 31 and the second blade 32, and thereby the dispensing nozzle tip 101a is cut while being held within a range defined by the first blade surface 311 and the second blade surface 312 of the first blade 31 and the blade surface 321 of the second blade 32. The other cutting parts related to the dispensing heads 17b and 17c also have a similar configuration.

An ellipse hole 313 is formed in each first blade 31 of the plurality of cut parts, a pin 45 provided on a movable base 44 (connecting member) is inserted thereinto, and the first blades 31 of the cut parts are connected to one another by the movable base 44. The movable base 44 is fixed to a timing belt 43 which transfers a power of a motor 42, which is an actuator, and the movable base 44 is moved by rotation of the motor 42 and the first blade 31 of each cut part is rotated via the pin 45, thereby cutting the plurality of dispensing nozzle tips 101a, 101b, and 101c respectively placed on the plurality of cutting machine parts at once. As illustrated in FIG. 5, a tip holding unit is provided below the first blade 31 and the second blade 32 of each cut part (in the back direction of the drawing sheet of FIG. 4). Hereinafter, the tip holding unit related to the dispensing head 17a will be described as a representative, and the description of other tip holding units having the similar configuration will be omitted.

The tip holding unit related to the dispensing head 17a includes: a first tip holding member 33 rotatably provided coaxially with the first blade 31 and abutted on a side surface of the dispensing nozzle tip 101a along the first blade surface 311 of the first blade 31, the first tip holding member 33 restrained from rotation relative to the first blade 31 from a position along the first blade surface 311 of the first blade 31 to the dispensing nozzle tip 101a side; a second tip holding member 34 provided to abut on a side surface of the dispensing nozzle tip 101a from a direction opposite to the first tip holding member 33 (in the same direction as the blade surface 321 of the second blade 32) and provided along the blade surface 321 of the second blade 32; and an elastic member 38 (e.g., an elastic body, such as a spring) energizing the first tip holding member 33 to the dispensing nozzle tip 101a side, causing the first tip holding member 33 to rotate as the first blade 31 rotates toward the dispensing nozzle tip 101a side, and thereby gripping the dispensing nozzle tip 101a with the second tip holding members 34.

More specifically, the first tip holding member 33 rotatably supported by the pin 35 is placed below the first blade 31. Moreover, the first tip holding member 33 includes: a rubber 331 surface having cushioning characteristics abutting on the side surface of the dispensing nozzle tip 101a along the first blade surface 311 of the first blade 31; and a protruding portion 332 formed so as to rise in the direction of the first blade 31 and abutting on the first blade 31, thereby restraining the rotation of the first tip holding member 33 toward the dispensing nozzle tip 101a side from the first blade surface 311. Moreover, the second tip holding member 34 fixed to the base 41 is placed below the second blade 32 in the same manner as the second blade 32. The second tip holding member 34 has a rubber surface 341 having cushioning characteristics abutting on the side surface of the dispensing nozzle tip 101a along the blade surface 321 of the second blade 32. The other tip holding units related to the dispensing heads 17b and 17c also have a similar configuration.

A positional relationship between the first blade 31 and the second blade 32 will now be described.

It is preferable that the dispensing nozzle tip 101a does not escape from a position between the first blade 31 and the second blade 32 during cutting of the dispensing nozzle tip 101a by the first blade 31 and the second blade 32. For example, when a rotation shaft (the pin 35) is in a position outside an extension line of the blade surface 321 of the second blade 32, the dispensing nozzle tip 101a moves in a direction (leftward in FIG. 4) to escape from the position between the first blade 31 and the second blade 32 during the cutting process. Therefore, the rotation shaft (pin 35) is preferable to be in the position between the first blade surface 311 of the first blade 31 and the blade surface 321 of the second blade 32.

Moreover, the closer the rotation shaft (the pin 35) is to the first blade 31 and the second blade, the greater an amount of movement of the motor 42 is required (the amount of movement of the movable base 44 is increased), but a torque of the motor 42 can be relatively small. Accordingly, it is preferable that, when the dispensing nozzle tip 101a to be cut is hard, the rotation shaft (the pin 35) is preferable to be moved close to the first blade 31 and the second blade 32.

Moreover, when a gap between the first blade surface 311 of the first blade 31 and a blade surface 322 of the second blade 32 is narrow, the dispensing nozzle tip 101a cannot be placed therebetween, and when it is too wide, an amount of movement of the motor 42 increases. Therefore, the gap between the first blade surface 311 of the first blade 31 and the blade surface 322 of the second blade 32 is preferable to be slightly wider than an outer diameter of the dispensing nozzle tip 101a to be cut (e.g., the tip diameter+approximately 1 to 3 mm).

A tip disposal operation performed by the cutting mechanism 25 configured as described above will now be described. Hereinafter, an operation related to the dispensing head 17a will be described as a representative, and the description of an operation of other dispensing heads having the similar configuration will be omitted.

Figure 6:
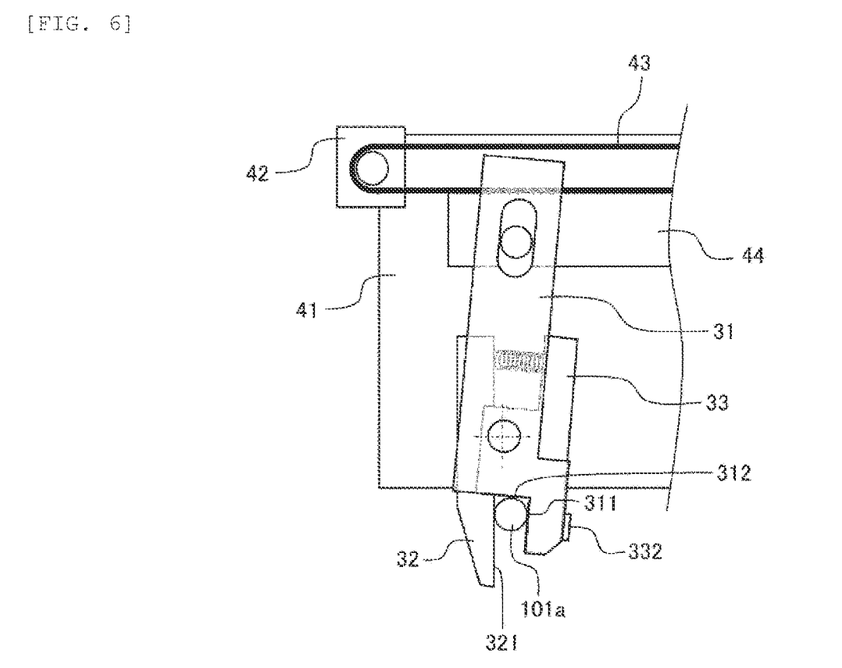
FIG. 6 is a plan view diagram illustrating a state where the dispensing nozzle tip is inserted into the cutting mechanism.
Figure 7:
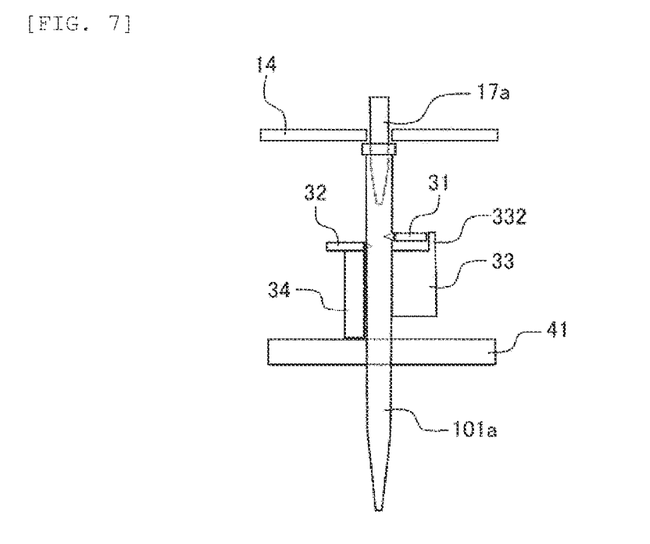
FIG. 7 is a longitudinal sectional view diagram illustrating the state where the dispensing nozzle tip is inserted into the cutting mechanism.
Figure 8:
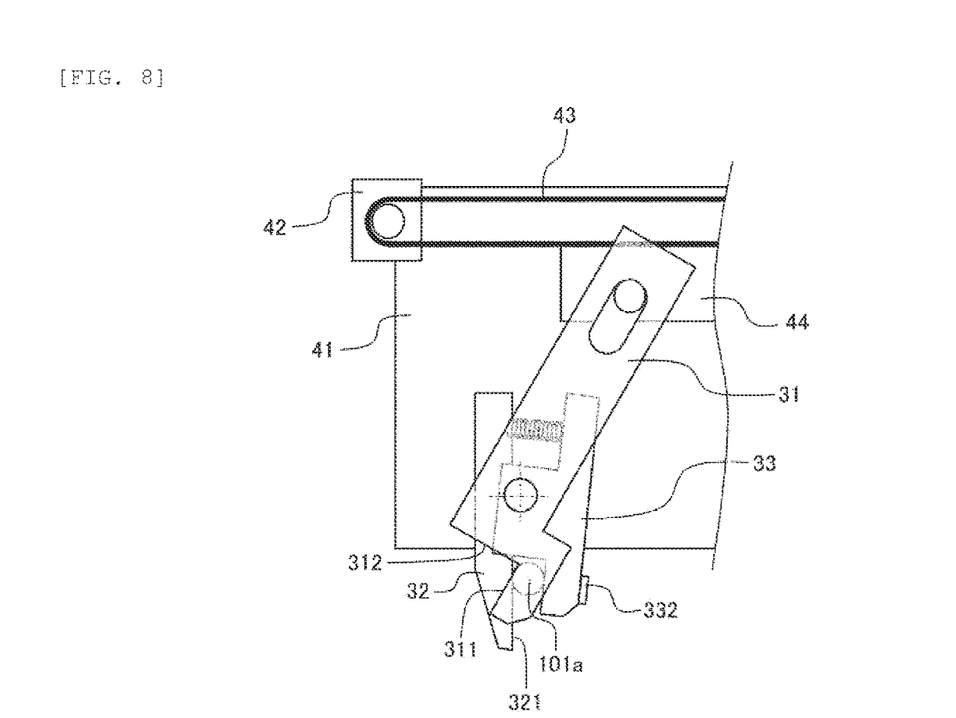
FIG. 8 is a plan view diagram illustrating a state where the dispensing nozzle tip is cut by the cutting mechanism.

FIG. 6 is a plan view diagram illustrating a state where the dispensing nozzle tip is inserted into the cutting mechanism, and FIG. 7 is a longitudinal sectional view diagram thereof. FIG. 8 is a plan view diagram illustrating a state where the dispensing nozzle tip is cut by the cutting mechanism, and FIG. 9 is a longitudinal sectional view diagram thereof.

First, the dispensing heads 17a, 17b, and 17c to which the dispensing nozzle tips 101a, 101b, and 101c to be disposed are respectively attached are moved to a position of to be inserted into the U-shaped notches of the tip remover 14 from the horizontal direction (this position illustrated in FIG. 3 is hereinafter referred to as a tip disposal position). At this time, a central vicinity in the longitudinal direction of each of the dispensing nozzle tips 101a, 101b, and 101c in the state of being attached to each of the dispensing heads 17a, 17b, and 17c is placed between the first blade 31 and the second blade 32 of the cut part of the cutting mechanism 25 in the disposal duct 15.

Subsequently, in a state where the dispensing heads 17a, 17b, and 17c (in other words, the dispensing nozzle tips 101a, 101b, and 101c) are placed at the tip disposal position, an operation of the cutting mechanism 25 is started, and the motor 42 is driven to rotate, and the movable base 44 is moved via the timing belt 43. Consequently, as illustrated in FIGS. 6 and 7, the pin 45 of the movable base 44 rotates the first blade 31 clockwise around the pin 35 (i.e., in a direction where the first blade surface 311 and the second blade surface 312 of the first blade 31 approach the blade surface 321 of the second blade 32). Further, as the first blade 31 rotates, the first tip holding member 33 rotates in the same direction as the first blade 31 due to an energizing force of the elastic member 38. Consequently, it is in a state where the dispensing nozzle tip 101a is sandwiched between the first blade surface 311 and the second blade surface 312 of the first blade 31 and the blade surface 321 of the second blade 32. A lower side of a cutting portion of the dispensing nozzle tip 101a (the position of the first blade 31 and the second blade 32) is gripped by the first tip holding member 33 and the second tip holding member 34.

Figure 9:
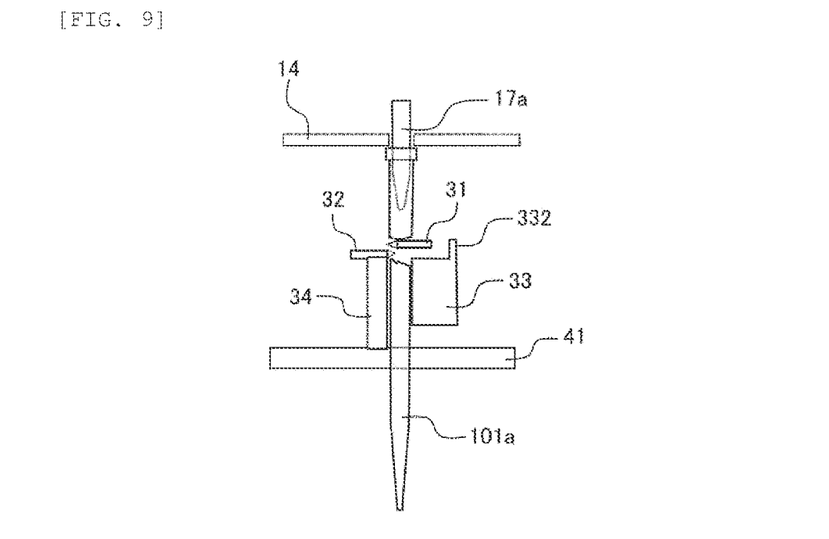
FIG. 9 is a longitudinal sectional view diagram illustrating the state where the dispensing nozzle tip is cut by the cutting mechanism.

Furthermore, when the motor 42 is rotationally driven and the movable base 44 moves, as illustrated in FIGS. 8 and 9, the dispensing nozzle tip 101a is cut from a side thereof by the first blade surface 311 and the second blade surface 312 of the first blade 31 and the blade surface 321 of the second blade 32.

At this time, a portion of the dispensing nozzle tip 101a above the cut surface thereof is held in a state of being attached to the tip of the dispensing head 17a, and a portion below the cut surface thereof is in a state of being gripped by the first tip holding member 33 and the second tip holding member 34 (a tip gripper).

After the dispensing nozzle tip is cut, the motor 42 of the cutting mechanism 25 rotates in an opposite direction (clockwise direction) and the first blade 31 and the first tip holding member 33 are in an opened state, and thereby the lower portion of the dispensing nozzle tip 101a after cutting gripped by the first tip holding member 33 and the second tip holding member 34 is released and disposed of into the disposal box 20.

Then, the dispensing head 17a rises, and the upper portion of the dispensing nozzle tip 101a after cutting attached to the dispensing head 17a is caught in the U-shaped notch of the tip remover 14, falls out from the dispensing head 17a, and is disposed of into the disposal box 20.

Effects of the present embodiments configured as described above will now be described.

Figure 10:
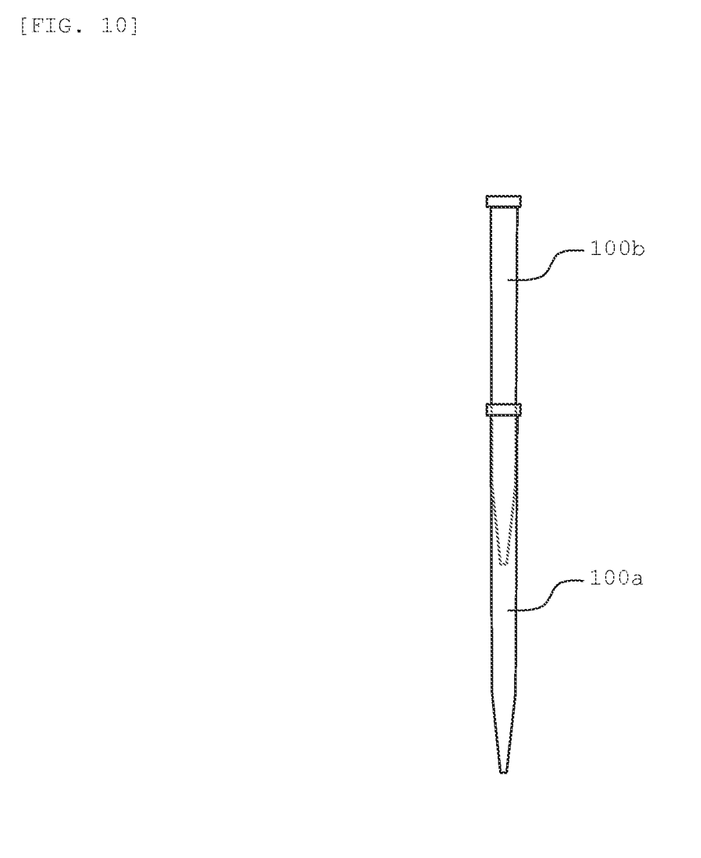
FIG. 10 is a diagram illustrating a stacked state of dispensing nozzle tips in a background technique.

FIG. 10 is a diagram illustrating a stacked state of dispensing nozzle tips in a background technique.

Since there is a limit to the number of dispensing nozzle tips that can be accommodated in a disposal box, for example, when exceeding a preset threshold value, an alarm is issued to prompt an operator to remove dispensing nozzle tips in the disposal box therefrom. On the other hand, since a dispensing device is temporarily suspended in its processing when removing the dispensing nozzle tips inside the disposal box therefrom, it is preferable that a frequency of such removal is reduced.

In disposing of dispensing nozzle tips in the dispensing device, for example, tip removers are placed in two locations above the box to dispersedly dispose of the dispensing nozzle tips, thereby preventing the dispensing nozzle tips to be stacked in the disposal box from concentrating in one location. However, there is a problem in that when dispensing nozzle tips disposed-of are stacked in the disposal box, in some rare cases, the dispensing nozzle tips may be accumulated in a bamboo shoot shape as illustrated in FIG. 10, and when such a phenomenon occurs, the dispensing nozzle tips are easily accumulated up to an entrance of the disposal box, thereby making it impossible to dispose of subsequent dispensing nozzle tips.

In contrast, according to the present embodiments, it is configured so that the dispensing nozzle tips 101a, 101b, and 101c inserted in the removal part (tip disposal position) for removing the dispensing nozzle tips 101a, 101b, and 101c respectively from the dispensing heads 17a, 17b, and 17c (dispensing nozzles) are cut from a longitudinal-direction side thereof, and thereby it is possible to improve accommodation efficiency while suppressing accumulation of the disposed-of dispensing nozzle tips 101a, 101b, and 101c.

The overall operation of the dispensing module in the present embodiment configured as described above will now be described.

When the primary specimens and aliquot specimen containers transported to the dispensing module 6 are transported and respectively reached to the dispensing waiting position of the primary specimen 11a on the primary specimen transportation line 11 and the aliquot specimen dispensing waiting position 12a on the aliquot specimen transportation line 12, the primary specimen and aliquot specimen containers are fixed by the gripping member not illustrated.

Subsequently, the dispensing heads 17a, 17b, and 17c are moved above the tip magazine 18 and are lowered, and the dispensing heads 17a, 17b, and 17c are respectively inserted into and thereby attached to the dispensing nozzle tips 101a, 101b, and 101c of the tip magazine 18.

Thereafter, the dispensing heads 17a, 17b, and 17c, are risen, are moved above the dispensing waiting position of the primary specimen 11a, and are lowered. During the lowering, when the dispensing nozzle tips 101a, 101b, and 101c are in contact with a liquid surface of the primary specimen, the specimens in the primary specimen containers are respectively aspirated into the dispensing nozzle tips 101a, 101b and 101c using pressure changes.

Subsequently, the dispensing heads 17a, 17b, and 17c are risen in a state where the primary specimen filled in the dispensing nozzle tips 101a, 101b, and 101c, and then are moved above the aliquot specimen dispensing waiting position 12a and are lowered. When tips of the dispensing nozzle tips 101a, 101b, and 101c respectively reach tube bottoms of the aliquot specimen containers, the lowering is stopped, and the specimens filled in the dispensing nozzle tips 101a, 101b, and 101c are respectively discharged into the aliquot specimen containers using pressure changes (dispensing process) while rising. The primary specimens and the aliquot specimen containers in which the dispensing process is completed are respectively transported by the primary specimen transportation line 11 and the aliquot specimen transportation line 12, and are carried out from the dispensing module 6 through the carry-out line 13.

After the dispensing process is completed, the dispensing heads 17a, 17b, and 17c are moved above the disposal duct 15, and are lowered. When the upper edge of the dispensing nozzle tips 101a, 101b, and 101c respectively attached to the dispensing heads 17a, 17b, and 17c are lowered to a position of a lower surface of the tip remover 14, the dispensing heads 17a, 17b, and 17c are moved in a horizontal direction, and are respectively inserted into the U-shaped notches of the tip remover 14, and the tip disposal operation of the dispensing nozzle tips 101a, 101b, and 101c are performed by the cutting mechanism 25 at the tip disposal position (refer to FIG. 3).

<Additional Remarks>

It is to be noted that the present invention is not limited to the embodiments described above, but includes various modification examples and combinations within the scope not deviating from the gist of the present invention. In addition, the present invention is not limited to embodiments including all the configurations explained in the embodiments described above, but includes embodiments in which some of the configurations are removed therefrom. In addition, the configurations, functions and the like described above may be obtained by designing some or all of them, for example, by an integrated circuit or by other means. In addition, the configurations, functions and the like described above may be obtained by software by a processor interpreting and executing a program that obtains the functions.

REFERENCE SIGNS LIST

1: Specimen test automation system
2: Input module
3: Centrifugal separation module
4: Decapping module
5: Aliquot tube preparation module
6: Dispensing module
7: Closing module
8: Storage module
11: Primary specimen transportation line
11a: Dispensing waiting position of the primary specimen
12: aliquot specimen transportation line
12a: Aliquot specimen dispensing waiting position
13: Carry-out line
14: Tip remover
15: Disposal duct
17a: Dispensing head
17b: Dispensing head
17c: Dispensing head
18: Tip magazine
20: Disposal box
25: Cutting mechanism
31: First blade
32: Second blade
33: First tip holding member
34: Second tip holding member
35: Pin
38: Elastic member
41: Base
42: Motor
43: Timing belt
44: Movable base
45: Pin
101a: Dispensing nozzle tip
101b: Dispensing nozzle tip
101c: Dispensing nozzle tip
311: First blade surface
312: Second blade surface
313: Ellipse hole
321: Blade surface
322: Blade surface
331: Rubber surface
332: Protruding portion
341: Rubber surface

The invention claimed is:

1. A preprocessing device configured to carry out a dispensing process for aspirating a liquid specimen accommodated in a specimen container, and subsequently discharging and dispensing the specimen into another specimen container, the preprocessing device characterized by comprising:

a dispensing nozzle;

a dispensing nozzle tip detachably provided to a tip of the dispensing nozzle;

a disposal box in which the dispensing nozzle tip is disposed of after having been removed from the dispensing nozzle; and a cutting mechanism for cutting a dispensing nozzle tip inserted into a removal part from a longitudinal-direction side, the removal part configured to remove the dispensing nozzle tip from the dispensing nozzle.

2. The preprocessing device according to claim 1, characterized in that the cutting mechanism comprises:

a first blade including a first blade surface and a second blade surface continuously formed so as to abut from different directions on a side surface of the dispensing nozzle tip, the first blade rotatably provided in a direction along a plane including the first blade surface and the second blade surface; and a second blade having a blade surface formed so as to abut on a side surface of the dispensing nozzle tip from a different direction from the first blade surface and the second blade surface of the first blade, the second blade relatively fixed to the first blade, wherein the first blade is rotated in a direction of the second blade in a state where the dispensing nozzle tip is placed between the first blade and the second blade, and thereby the dispensing nozzle tip is cut while being held within a range defined by the first blade surface and the second blade surface of the first blade and the blade surface of the second blade.

3. The preprocessing device according to claim 2, characterized by further comprising:

a plurality of the cutting mechanisms;

a connecting member configured to connect the respective first blades of the plurality of cutting mechanisms; and an actuator configured to rotate the respective first blade of the plurality of cutting mechanisms via the connecting member so as to cut a plurality of dispensing nozzle tips respectively placed on the plurality of cutting mechanisms at once.

4. The preprocessing device according to claim 2, characterized in that the cutting mechanism comprises:

a first tip holding member rotatably provided coaxially with the first blade and abutted on a side surface of the dispensing nozzle tip along the first blade surface of the first blade, the first tip holding member restrained from rotation relative to the first blade from a position along the first blade surface of the first blade to the dispensing nozzle tip side;

a second tip holding member provided to abut on a side surface of the dispensing nozzle tip from a direction opposite to the first tip holding member, the second tip holding member provide along the blade surface of the second blade; and an elastic member energizing the first tip holding member to the dispensing nozzle tip side, causing the first tip holding member to rotate as the first blade rotates toward the dispensing nozzle tip side, and thereby gripping the dispensing nozzle tip with the second tip holding members.

* * * * *